United States Patent [19]
Klaric

[11] Patent Number: 4,815,178

[45] Date of Patent: Mar. 28, 1989

[54] MOVEMENT RESISTIVE LOCKING MECHANISM

[76] Inventor: Dinko Klaric, 165 City Road, South Melbourne, Victoria, Australia, 3205

[21] Appl. No.: 77,676

[22] Filed: Jul. 23, 1987

[30] Foreign Application Priority Data

Jul. 23, 1986 [AU] Australia .................. PH07102

[51] Int. Cl.⁴ ............................................. A44B 21/00
[52] U.S. Cl. ........................................ 24/606; 24/588; 24/287
[58] Field of Search ............... 24/604, 605, 606, 607, 24/608, 609, 610, 287; 220/1.5

[56] References Cited

U.S. PATENT DOCUMENTS

| | | | |
|---|---|---|---|
| 769,490 | 8/1905 | Baker | 24/606 |
| 2,676,822 | 4/1954 | Modrey | 24/606 |
| 3,386,696 | 6/1968 | Duval et al. | 24/287 |
| 3,592,495 | 7/1971 | Fisher | 24/287 |
| 3,753,272 | 8/1973 | Laidley | 24/287 |
| 4,286,360 | 9/1981 | Skobel | 24/588 |

FOREIGN PATENT DOCUMENTS 552608  7/1982  Australia .

*Primary Examiner*—Victor N. Sakran
*Attorney, Agent, or Firm*—Mason, Fenwick & Lawrence

[57] ABSTRACT

A lock of the type generally described in Australian Patent Specification No. 552,608, comprising a bearing housing, a holding member and an eccentric pin, generally disposed and mechanically inter-related in the manner described in said specification, the bearing housing having forwardly directed means adapted to extend through a slot of a profile bar or the like to which, in use, the lock is to be secured, and the holding member having a hook element at the forward end thereof; characterized in that the forwardly directed means is so configured as to provide a positive lock behind or around the slot on the opposite side of the slot to that which the hook element assumes when the lock is secured to the profile bar or the like.

2 Claims, 3 Drawing Sheets

MOVEMENT RESISTIVE LOCKING MECHANISM

The present invention relates to locks, and more particularly locks of the type generally described in Australian Patent Specification No. 552,608 (herein called the '608 lock').

The 608 lock suffers from several disadvantages. First of all, whilst the lock when in position in a profile bar is not prone to inadvertent withdrawal from or sliding movement with respect to the bar, there is some tendency for the lock to wobble in an up/down direction (see, for example, FIGS. 3 and 4 of the 608 specification). Moreover, the eccentric pin upon rotation can be subject to inadvertent forcing with consequential distortion of the bearing housing.

It is with these disadvantages in mind that modifications have been made to the 608 lock. The present invention addresses one modification directed at overcoming the first-mentioned disadvantage. (A second application deals with a separate invention centred around and stemming from the second-mentioned disadvantage.)

Broadly stated, the present invention makes provision for a lock of the type generally described in the 608 specification, comprising a bearing housing, a holding member and an eccentric pin, generally disposed and mechanically inter-related in the manner described in the 608 specification, the bearing housing having forwardly directed means adapted to extend through a slot of a profile bar or the like to which, in use, the lock is to be secured, and the holding member having a hook element at the forward end thereof; characterized in that the forwardly directed means is so configured as to provide a positive lock behind or around the slot on the opposite side of the slot to that which the hook element assumes when the lock is secured to the profile bar or the like.

Preferably, the forwardly directed means comprises a pair of wings which flank the hook element.

Preferably, also, that portion of the forwardly directed means that provides the positive lock is in the form of a stepped indent, and, generally opposite thereto, is a guide ramp which ensures that the indent positively engages the said opposite side of the slot upon the lock being actuated to effect a securing to the profile bar or the like.

In order that the present invention may be more fully described, reference is made to a preferred embodiment. This embodiment is illustrated in the accompanying drawing in which FIG. 1 is a perspective view of the lock of this invention;

Figure 1:
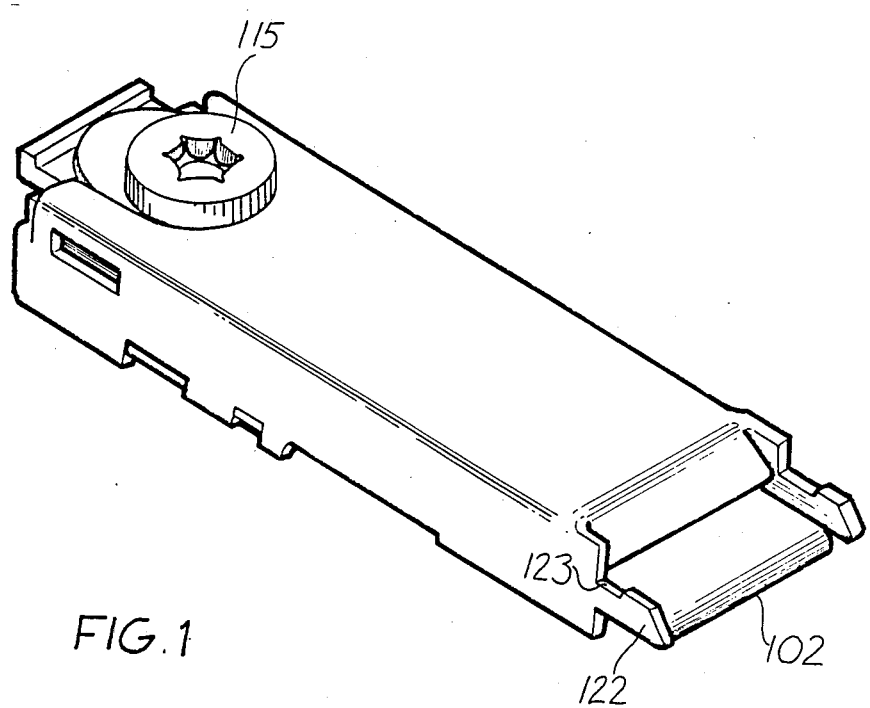

The holding member assumes the form of a sheet metal strip 100. The front end 101 of the strip is provided with a rearwardly bent hook 102. From the adjacent centre section 103 of the strip, a pair of resilient tongues 104 flanking the centre section are cut out and then bent out of the plane of that section. The inner end 105 of the strip—that is, that end remote from the hook 102—may be described as a control section. This section has a slot 106 cut out of it, and the edge of the slot facing the centre section 103 is stepped as at 107 to break the generally oval configuration of the slot. Adjacent the facing slot edge is a small raised hump section 108; adjacent the opposite slot edge 109, and indeed at the end of the strip, is a central bevelled edge 110. The hump 108 and edge 110 define therebetween a space dimensioned to snugly accept the head of the eccentric pin further particulars of which are set out below.

Figure 4:
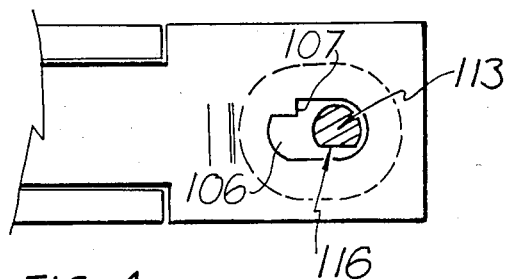
FIG. 4 is a cross-sectional plan elevation showing the eccentric pin journal disposition corresponding to the unlocked state of FIG. 2.
Figure 5:
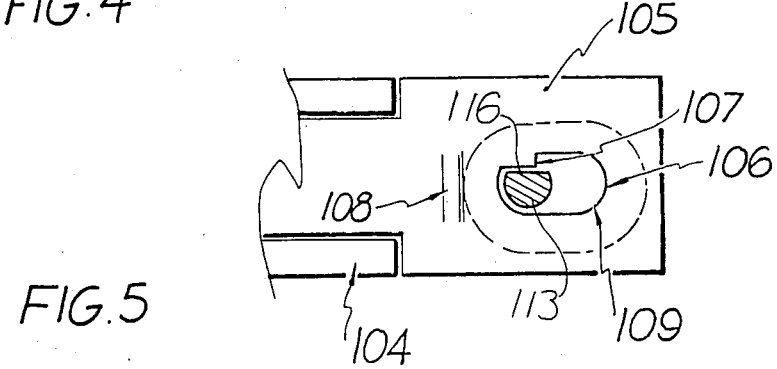
FIG. 5 is a similar view save that the disposition corresponds to the locked state of FIG. 3.

The eccentric pin 111 comprises a circular head 112 and a journal 113 extending axially therefrom but between which is disposed an eccentric disc 114. The top surface 115 of the pin head has a suitably profiled recess (not shown) to accomodate the head of a screwdriver or like tool by means of which the pin may be rotated. The journal, at a location next to the underside of the eccentric disc, is slotted to thereby afford a flat 116. This may best be seen in FIGS. 4 and 5 where, for convenience, the journal only is illustrated (by hatching). In FIG. 5 it may be noted that the pin is unable to be rotated beyond 180° from the FIG. 4 position. The flat 116 is simply arrested by the step 107.

The bearing housing is generally designated as 117. It is of generally rectangular shape, with a crosssection adapted to match the hollow section of one of the profile bars to which it is to be fitted. The housing consists actually of two parts, a principal part 118 and a secondary part 119. The latter is a flat plate appropriately apertured to accomodate the end of the journal 113. The plate is suitably secured to the principal part 118 by the provision of a pair of turned over lugs (not shown) on the part 118.

Figure 2:
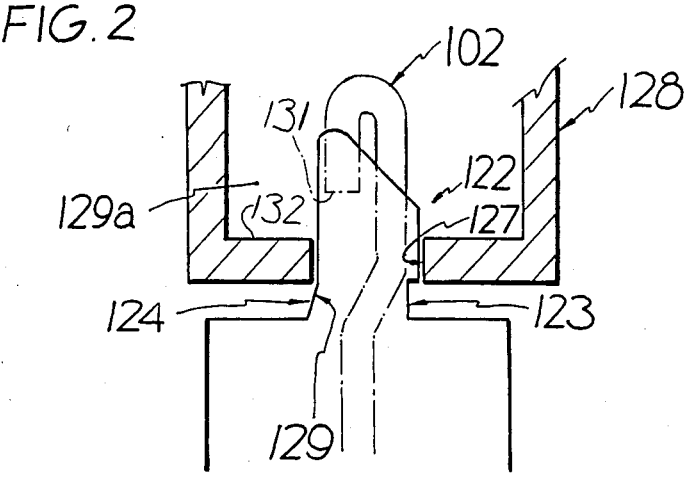
FIG. 2 is a part cross-sectional view showing the securing end of the lock in an inserted but unlocked state.
Figure 6:
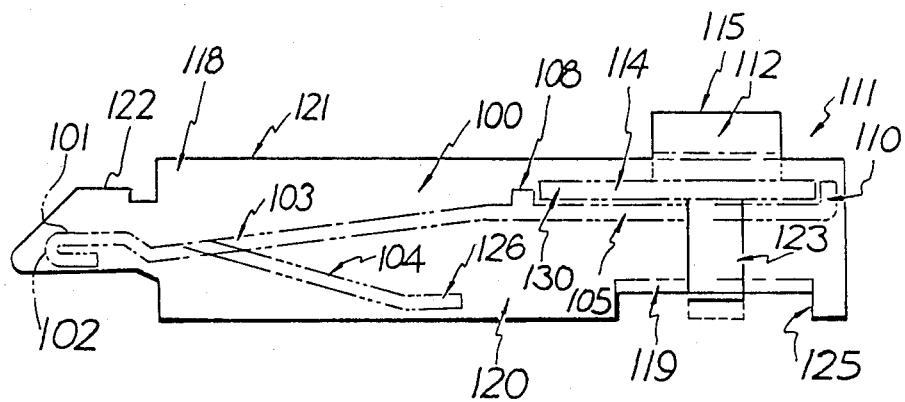
FIG. 6 is a side elevation of the lock.

The part 118 is of generally inverted U-shaped configuration throughout its length (with reference to FIG. 6). Side walls 120 and a flat top 121 provide the bulk of the part 118. Two small wings 122 extend forwardly of the side walls and these wings, when the lock is assembled, flank the hook 102. Each wing is characterized by a stepped indent 123 and, opposite thereto, a sloping ramp 124 (see FIG. 2). The side walls 120 are slotted, 125, near the rear ends of the walls, and a part of the plate 119, again when the lock is assembled, is seated on the bases of the slots. These slot bases are, however, modified to the extent of having the aforementioned securing turned over lugs. The rear ends of the side walls include turned in lugs (not shown) which serve to locate the plate 119 and prevent inadvertent longitudinal movement with respect to the bearing housing. Intermediate the ends of the side walls are further inturned lugs (not shown), this time extending in a plane parallel to that of the top 121. These lugs constitute bearing surfaces for the free ends 126 of the tongues 104.

Figure 3:
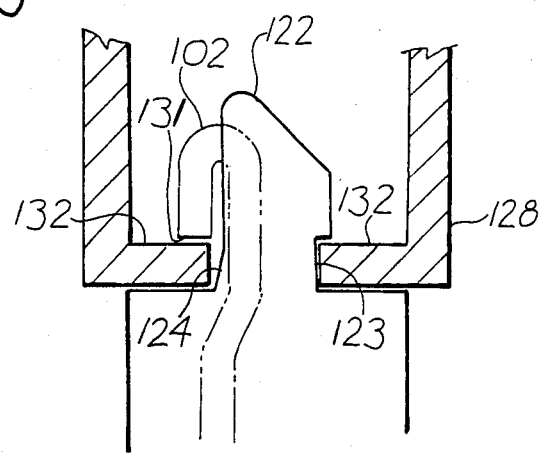
FIG. 3 is a similar view save that the lock is in a locked state.

Locking of the lock in position is a very simple operation. The lock, with the strip 100 and the eccentric pin 111 in the positions shown in FIGS. 2 and 4, respectively, is inserted into the slot 127 of the profile bar 128 to the point where the leading end 129 of the ramp 124 is adjacent a facing edge of one of the slot walls (see FIG. 2). The hook 102, at this point, bears against a base of the channel 129a, so preventing the wings 122 from further entering the channel. At this point, the eccentric disc occupies the position shown in FIG. 5—that is, with the longer reach 130 of the disc extending in a forwards direction. The eccentric pin is then turned through 180° and the longer reach in thus turning bears on the bevelled edge 110 of the strip 100, so progressively forcing the edge and hence the strip as a whole in a rearwards (or retracting) direction. The positions adopted by the hook 102 and the eccentric pin 111 pursuant to this turning are those illustrated in FIGS. 2 and 3, respectively. With the attendant retraction of the hook 102, the wings 122 are able to penetrate the channel 129a to a maximum extent. During the locking process, the wings are 'guided' towards the FIG. 2 position under the influence of the ramp 124. The net result is a positive locking of the wings within the channel by virtue of the stepped indent 123. This movement of the wings is matched by movement of the hook 102 in both a retracting direction (as previously stated) and a lateral direction, the latter however in an opposite sense to that, albeit relatively slight, of the wings. The lateral movement of the hook ensures that the free end 131 engages firmly with the inside wall 132 of the profile bar 128. There is then a 'nice' counterbalance between the free end 131 and the indent 123, the effect of which is a positive locking state and little or no tendency for wobble in the bearing housing 117.

For further details of the relative disposition and movement of the three basic parts of the lock—namely, the strip 100, the eccentric pin 111 and the bearing housing 117 —regard can be had to the description in Australian Patent Specification No. 552,608.

It is to be appreciated that variations and/or modifications may readily be made to the foregoing specific embodiment without in any way departing from the overall spirit and scope of the invention.

We claim:

1. A locking device for fitment to a slotted profile bar, the device including a bearing housing, a movable coupling hook mounted within the housing for interconnection with said slotted profile bar, an eccentric pin, said coupling hook being slidably mounted in said bearing housing for movement to an extended position extending from said bearing housing to allow interconnection with a slot in said profile bar, said eccentric pin being configured and positioned to move said coupling hook to its extended position, said bearing housing including a fixed slot engaging means associated with said coupling hook, said slot engaging means including a pair of wings flanking said coupling hook, each of said wings including a surface adapted to bear against said slot in use and wherein said surface includes an indented notch-like surface providing a positive interlock with said slot, to restrict or prevent inadvertent withdrawal and sliding movement of said wings and coupling hook relative to said profile bar.

2. A locking device as recited in claim 1 wherein said notch-like surface is of U-shaped configuration having substantially parallel side walls.

* * * * *